US009921329B2

(12) United States Patent
Banas

(10) Patent No.: US 9,921,329 B2
(45) Date of Patent: Mar. 20, 2018

(54) AUTOMATED METHOD FOR SELECTING POSITIONS WITHIN FORMATIONS FROM WHICH TO EXTRACT SAMPLES THEREOF

(71) Applicant: Apache Corporation, Houston, TX (US)

(72) Inventor: Ryan Banas, Houston, TX (US)

(73) Assignee: Apache Corporation, Houston, TX (US)

( * ) Notice: Subject to any disclaimer, the term of this patent is extended or adjusted under 35 U.S.C. 154(b) by 266 days.

(21) Appl. No.: 14/936,731

(22) Filed: Nov. 10, 2015

(65) Prior Publication Data

US 2016/0146970 A1     May 26, 2016

Related U.S. Application Data

(60) Provisional application No. 62/082,190, filed on Nov. 20, 2014.

(51) Int. Cl.
G01V 11/00     (2006.01)
G01V 1/50      (2006.01)

(52) U.S. Cl.
CPC .................................... G01V 1/50 (2013.01)

(58) Field of Classification Search
None
See application file for complete search history.

(56) References Cited

PUBLICATIONS

J. Kennedy, Using Quantified 'Model Based' Petrophysical Uncertainty to Aid in Conflict Resolution, SPWLA 51st Annual Logging Symposium, Jun. 19-23, 2010, pp. 1-12.*
Minh Tuan Tran, Formation Evaluation of an Unconventional Shale Reservoir , Application to the North Slope Alaska Jun. 2014 , 63 pages.*

* cited by examiner

*Primary Examiner* — Tung Lau
(74) *Attorney, Agent, or Firm* — Richard A. Fagin

(57) ABSTRACT

A method for selecting core points in subsurface formations includes selecting a zone from at least one subsurface formation. At least one statistical measure of at least one petrophysical measurement with respect to position along the selected zone is calculated. A predetermined number of core points at randomly selected positions along the selected zone is selected The at least one statistical measure is calculated for the randomly selected positions. Using a Monte Carlo iteration, the positions along the selected zone are randomly reselected and the at least one statistical measure is recalculated for the randomly reselected points until the at least one statistical measure for the randomly selected points is a maximum for a user selected statistical criterion applied to the at least one statistical measure of at least one petrophysical measurement with respect to position along the selected zone.

13 Claims, 7 Drawing Sheets

AUTOMATED METHOD FOR SELECTING POSITIONS WITHIN FORMATIONS FROM WHICH TO EXTRACT SAMPLES THEREOF

CROSS REFERENCED TO RELATED APPLICATIONS

Priority is claimed from U.S. Provisional Application No. 62/082,190 filed on Nov. 20, 2014.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

This disclosure is related to the field of evaluation of subsurface formations to determine mineral content, fluid content and fluid productivity. More specifically, the disclosure relates to methods based on measurements of petrophysical parameters for determining positions from within subsurface formations from which samples may be taken from within a wellbore or from a whole drilled core extracted from a wellbore.

Petrophysical and/or geological data may be obtained from subsurface geologic formations during and/or after drilling a wellbore through such formations. These data may be acquired in-situ by wireline, logging while drilling (LWD), measurement while drilling (MWD), cased-hole or other measurements made by moving sensors along the interior of a wellbore. Data may also be acquired using mud logs, laboratory measurements made on cores (whole cores, rotary drilled sidewall cores and/or percussion sidewall cores), drill cuttings, or other representative samples of selected subsurface formations.

When conducting a coring program it is often necessary to select a number of samples for laboratory analysis or qualitative observation (i.e., thin section microscopy). There are methods known in the art to select intervals within the wellbore from which to cut plugs from whole cores (cores drilled using well drilling equipment having an annular drill bit) or to select intervals in the wellbore to cut rotary sidewall cores (RSWCs) or to obtain percussion-type sidewall cores. Such selection methods include visual observation of the above described types of data in unprocessed form and/or after manual or computer implemented interpretation. Such selection techniques are prone to error and subject to individual interpretation, this including substantial subjective basis for selection of sample intervals. It is possible that without proper analysis of the above data important statistical members may be missed entirely in the data set that is to be constructed by the coring program (via subsampling). It is equally possible that the distribution of data collected may be skewed or not statistically representative of the core (actual data set).

DETAILED DESCRIPTION

Figure 1:
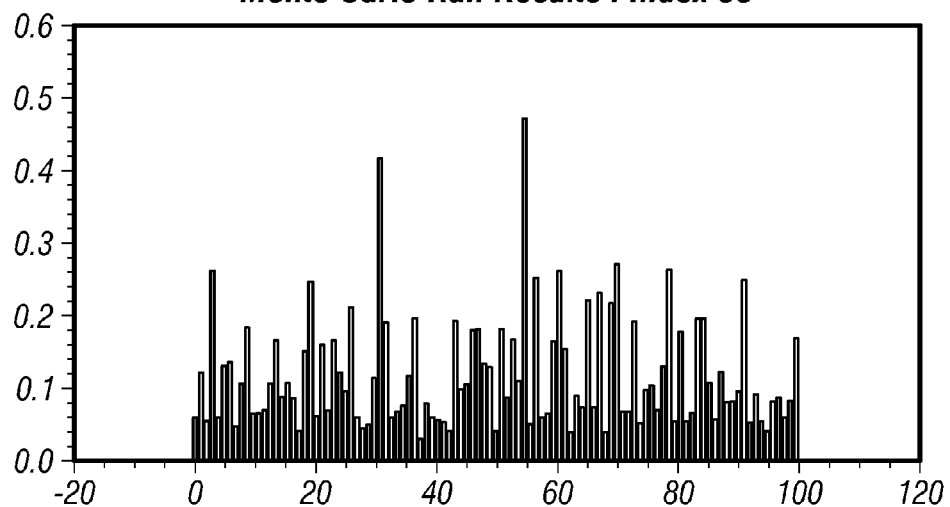
FIG. 1 shows an example plot of original filtered petrophysical data and superimposed solution data.
Figure 1:
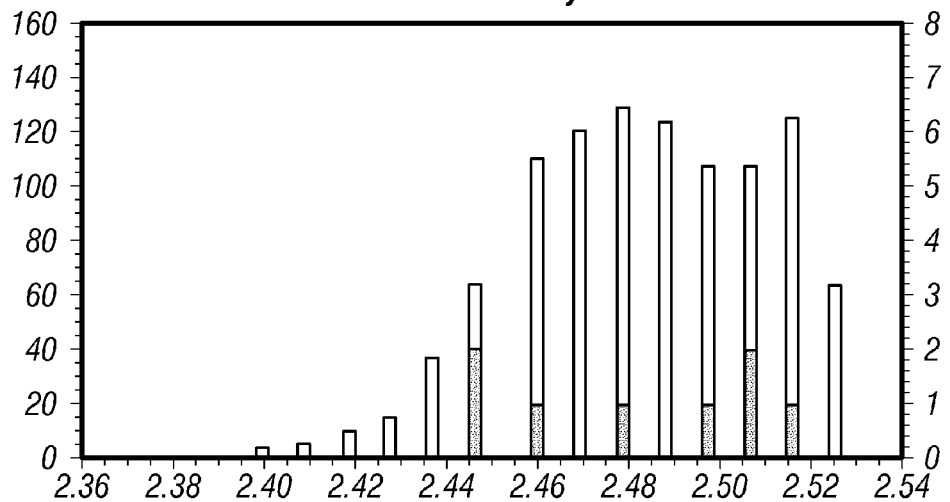
Figure 1:
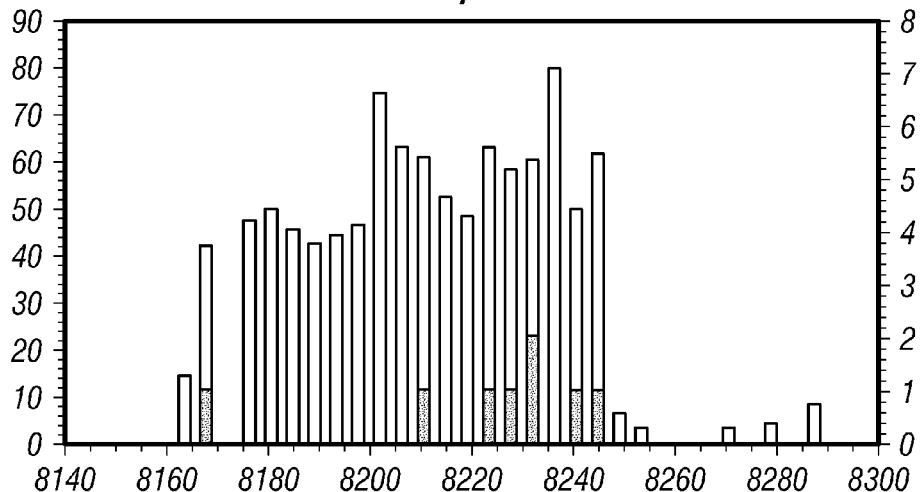
Figure 1:
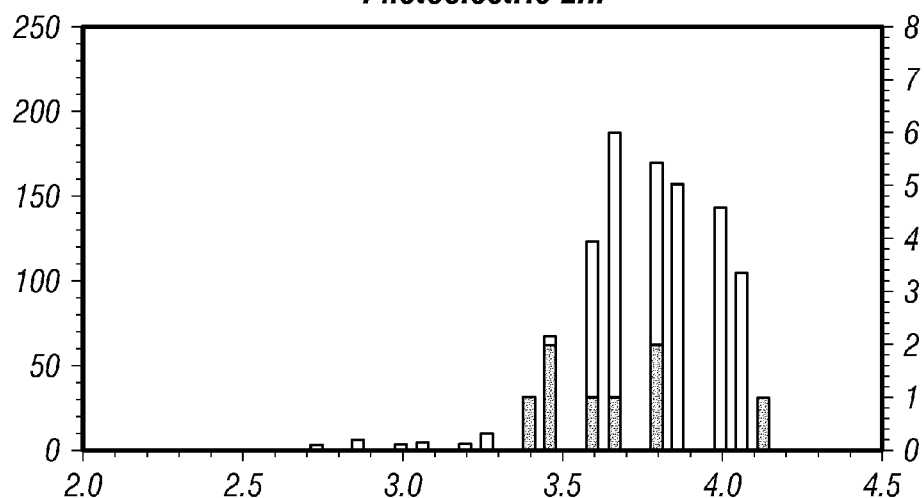

A formation sampling selection method according to the present disclosure may minimize the number of formation samples ("core points") required while preserving statistical integrity of the data thus obtained. Methods according to the present disclosure may assist an interpreter in determining an optimum number of formation samples required (N) and to automatically determine selection points from where (e.g., axial position) in a core or wellbore sidewall each of the N formation samples are extracted.

In order to provide a more mathematically robust method for selecting core points the following computer implemented methods may be applied to measured (unprocessed or raw) data, that is, measurements of physical properties of the formations related to formation parameters of interest. The methods may also be applied to manually or machine interpreted measurements (calculations of one or more physical properties made from the raw data or measurements) data in order to determine a number of samples N to obtain, e.g., by drilling from a whole core or obtaining wellbore wall samples from a wellbore, and the locations (i.e., measured depths in a wellbore or axial position along a whole core) in a whole core or wellbore from which they are to be obtained. The sample positions may be referred to herein for convenience as "core points." An example method according to the present disclosure may include procedural elements described in more detail below.

Core samples are typically retrieved to measure formation properties for geologically qualitative and petrophysically quantitative understanding of reservoir (economically useful fluid, e.g., oil and/or gas producing) and non-reservoir subsurface formations. In addition, a part of most petrophysical data interpretation methods includes calibration of petrophysical parameter measurements to certain physical properties measured on actual formation samples, e.g., cores, in order to increase accuracy of interpretation of petrophysical parameter measurements and to enable making predictions of formation properties, and where applicable, formation fluid productivity, with higher confidence than by interpretation of petrophysical parameter measurements without such calibration.

Two issues arise when selecting core points (that is, measured depths where the samples are taken from a wellbore wall, or one or more positions along the length of a core drilled using a core bit connected to wellbore drilling equipment):

1) how many physical samples are needed to obtain a representative set of petrophysical parameter values for a particular formation or depth interval; and
2) where (axial position or wellbore depth) should such samples be taken from within any defined formation, set of formations or depth interval.

Methods according to the present disclosure in the form of computer software executable on a programmable computer or computer system (see FIG. 5) are intended to assist core point selection for any or all of conventional cores post-extraction (post- or pre-slab), for rotary sidewall cores and percussion sidewall cores obtained from within a wellbore. Methods according to the present disclosure may accept as input to the computer or computer system a user-generated facies curve (e.g., a curve obtained from k-means clustering, artificial neural networks including, e.g., self-organizing maps and the like) and to statistically determine core points using best (non-unique) statistically derived solution(s) that are consistent with petrophysical data. In the present context, petrophysical data may include any and all forms of measurements of formation properties made from within a wellbore, whether or not a protective pipe (casing) has been placed in the wellbore. Such measurements may include, without limitation, electrical resistivity, acoustic shear and compressional velocities, density, neutron derived hydrogen index, natural gamma radiation, thermal and/or epithermal neutron capture cross-section, nuclear magnetic transverse and/or longitudinal relaxation times and photoelectric effect. Petrophysical data may also include measurements made at the surface of mineral content made from analysis of drill cuttings, analysis of fluids dispersed and/or dissolved in wellbore drilling fluid and fluid pressure measurements. All the foregoing are only examples and are not intended to limit the types of and the numbers of different petrophysical measurements that may be used in any specific embodiment according to the present disclosure. In the present context, the term "curve" as applied to measurements or interpreted parameters obtained from measurements is intended to mean a representation of the value of a particular measurement or interpreted parameter displayed with respect to axial position along a core or wellbore depth.

Using manual core point selection techniques known in the art, a skilled geoscientist may examine certain distinct formation properties that are the object of the core sample data acquisition, e.g., geomechanical properties of the formation and fractional volume of pore space in the formation, i.e., porosity. In manual core point selection, the geoscientist or other interpreter may visually identify one or more zones of varying geomechanical properties and porosity individually (e.g., from raw well log measurements, interpreted well log measurements and/or other measurements made a priori) and select core points from such visual observation. In the present context, the term "zone" may be used to mean an axial span along a core or along a wellbore wall that has characteristics that distinguish the formations within the span from other formations outside the span. As a non-limiting example, in a wellbore characterized by alternating layers of shale and relatively shale-free sandstone, a "zone" may be one of the layers of relatively shale free sandstone. A zone may be delineated by axial position boundaries, for example, axial endpoints along a core or upper and lower depths within a wellbore.

It is possible that a set of core points exists within any particular zone, formation or subset of a formation where a number of core points smaller than a number of independent formation physical parameters might be sufficient to be fully representative of the formation or zone therein quantitatively and with sufficient statistical precision. A method according to the present disclosure has as an objective automatically locating such core points and reducing the total number of core points while preserving or increasing the quality of core sample data distribution.

When the above described input is provided to a computer system by the user, a method according to the present disclosure may use a Monte Carlo iterative calculation in order to select subsamples of data from a combination set of n choose k possibilities as in the equation following.

$$\binom{n}{k} = \left[\frac{n!}{k!(n-k)!}\right]$$

As an example, 200 feet of whole core (e.g., as drilled using an annular drill bit) had been cut from a single geologic facies or formation, with a subsampling of eight, one inch (25 mm) diameter "plug" type samples extracted from the whole core. In the present example, n=2400, k=8 and n choose k from the above equation equals $2.69834 \times 10^{22}$ possible samples. The foregoing number of possible samples makes deterministic core point selection impracticable. There are other analytical methods to solve the foregoing core point selection problem as a system of non-unique solutions, wherein a solution represents a set of core points that best satisfies the statistical integrity of all input data provided by the user out of all possible core point combinations.

However, due to the number of degrees of freedom in a core point selection problem it is much easier to approximate a solution using a Monte Carlo iterative calculation procedure rather than using a deterministic procedure. Having explained the general basis for methods according to the present disclosure, example embodiments will be set forth in more detail below.

1. Initial Input Data Filtering

An input data set may include, without limitation, well log and other petrophysical measurement data as set forth above obtained by wireline or during drilling, laboratory measurements made on whole cores, mud log data and drill cuttings analysis. The input data may be stored in the form of values of a petrophysical parameter and the axial position (e.g., wellbore depth) at which each value is measured or calculated from measurements. The input data set may be filtered as needed or as required by the user prior to running a Monte Carlo model for selecting core points. Some filtering may be performed in order to make solution to the core point selection process more practicable. Filtering may be performed by the user setting filtered data characterization criteria or filtered data set inclusion/exclusion criteria, as non-limiting examples. Filtering may be performed by a computer or computer system (see FIG. 5) using the selected filter criteria as applied to the input data set, as examples, using the following filtering criteria.

Filter by facies: filtering by electrofacies or rock typing/grouping as determined by the user from visual or machine implemented facies determination from well logs, core samples and/or cuttings analysis.

Filter by zone: filter by geologic formation type as determined by the user from visual or machine implemented zone determination from well logs, core samples and/or cuttings analysis.

Filtering by electrofacies or by zone may comprise, for example and without limitation, using measurements of at least one of electrical resistivity, natural gamma radiation, neutron hydrogen index, density, thermal and/or epithermal neutron capture cross-section, nuclear magnetic relaxation time distribution and acoustic shear and/or compressional velocity and combinations thereof.

Filter by depth: optional data filtering by depth intervals as provided by the user as input to the selection method.

Additional filtering: optional data filtering of specific wellbore depth intervals or along whole core length intervals as provided by the user or selected automatically based on user input thresholds or empirically determined thresholds; an example may include annotation of the data with a 'fracture' flag where core is cracked and not suitable for core sample extraction or providing previously obtained sample depths to remove them (and surrounding points as provided by the exclusion input) from the set of possible sample depths. Other criteria may include, without limitation, exclusion of samples having natural gamma ray radiation emission above a selected threshold as indicative of too high a clay mineral content to be useful as representative of a reservoir formation.

Contiguous facies filtering: optional filtering of the data by contiguous intervals of data; the intervals may be determined by a running counter algorithm to identify continuous (uninterrupted) sections of facies that are adjoining and quantifying their depth endpoints; filtering may be applied by discarding contiguous blocks of data that do not meet a specific size requirement designed to be placed for physical core extraction (i.e., the section of formation must be at least as large as the planned extracted piece).

The data may be filtered in a specific order such that facies, zone, and depth filtering are performed before additional or contiguous facies filtering. Sequential ordering of the filtering is not necessary to affect the end result of the computations. An example filtered and solution data plot is shown in FIG. 1.

2. Subsequent Data Filtering

After any initial input data filtering as explained above, subsequent data filtering may be applied as an exclusion filter where specific points of data (e.g., wellbore sample depths or whole core axial positions) may be excluded from the data set (e.g., previously filtered as explained above) as prospective locations for core points, e.g., due to spatial proximity to existing selected core points and/or post-extraction formation core samples. Such exclusion filtering may be performed using threshold values input by the user for the number of data points in the static (and regular) core point data array that should be excluded within a selected threshold axial distance or depth interval from currently selected or post-extraction formation sample core points.

3. Sample Size (Number of Samples) Determination

Sample size, i.e., the number of core points, (N) may be determined using several example computations. The theory of statistical power, that is, statistical sensitivity or specificity, i.e., assessing the probability that a statistical test correctly rejects the null hypothesis when it is false, may be applied to assist the user in calculating the number of samples N that may be required to meet predetermined confidence interval and margin of error requirements. In addition, sample number requirements for laboratory (or other) analysis that is to be conducted (i.e., the partial or direct goal of a formation sample taking program) or other considerations accounted for by the user may contribute to the value of N. The type of data distribution (i.e. Gaussian), cost constraints, core constraints (formation damage, proximity between core points, etc.) may also affect N. For example, if the input data substantially conform to a Gaussian distribution, then only mean and standard deviation may be the required measurements to reproduce the distribution, for non-Gaussian distributions additional input data may be required.

4. Determining Core Points

Example processes according to the present disclosure to select core points operate as follows after the user has filtered the data appropriately, provided the number of core points required (N) (which may be a user selected number or other number calculated as explained above) and the number of Monte Carlo iterations the user wishes to perform on any particular filtered input data set.

The following sequence of operations may be performed independently for each of a plurality, of quantity, $\gamma$, different formation facies input by the system user. Filtering may be performed on subsequent iterations incorporating previously determined or extracted core points determined within other formations or facies to eliminate them from a particular iteration; if exclusion filtering is applied the foregoing constraints on the determined core points may be taken into account as well.

A quantity, M, of unique random numbers may be generated (e.g., by the computer or computer system in FIG. 5) in a range [0, Z] where Z represents an integer number of input data points in a first filtered input data array. Z may be selected by the user and provided as an input value to the computer or computer system. "Data array" as that term may be understood herein corresponds to a quantity, L of input data curves. An input data "curve" may be any individual parameter measurement as described above wherein a parameter measurement value is paired with the depth or axial position at which the measurement was made, for a selected range of depths or axial positions. The selected range of depths or axial positions may be the same length as the range Z. The total number of possible sets of random combinations in the input data array may be determined as shown in Eq. (1). Note that M is not equal to N in the case where previously obtained sample measurement values have been input by the user and replacement is occurring (i.e., selecting core points where previous selection of one or more core points failed to obtain a usable sample):

$$\binom{Z}{M} = \left[\frac{Z!}{M!(Z-M)!}\right] \quad (\text{Eq. 1})$$

For each kth input data curve (where k ranges from 1 to L+1, the additional input curve is the depth or axial position in the selected range) the following statistical calculations may be performed on the number Z of input curve data points for each data curve:

Mean
Variance
Standard Deviation
$1^{st}$ percentile
$10^{th}$ percentile
$90^{th}$ percentile
$99^{th}$ percentile The following statistics may be computed on the filtered, input curve data at the M random and unique indices in the data array, x times where x is a number of Monte Carlo iterations input to the computer system by the user:

Mean
Variance
Standard deviation
$1^{st}$ percentile
$10^{th}$ percentile
$90^{th}$ percentile
$99^{th}$ percentile At each of the x Monte Carlo iterations the following computation may be performed to determine the effect size equivalent value (ESEV, see Eq. 2) used to grade solutions, i.e., the results from each Monte Carlo iteration.

The user may select any of the above statistical criteria to be applied to the input data used to calculate the ESEVs.

In order to effectively spread core points out in depth, the following measures of ESEV statistics may be calculated as well:

$1^{st}$ percentile of ESEV
$10^{th}$ percentile of ESEV
$90^{th}$ percentile of ESEV
$99^{th}$ percentile of ESEV Depth spreading may also be performed by calculating variance in the resulting depths or axial positions of the core point set and selecting those with the largest variance to spread them in depth. The percentiles described above actually spread the coir points in percentile space and/or through the data distribution.

If exclusion filtering is selected by the user, the data used to calculate the ESEV values may be filtered accordingly. As an example, exclusion filtering may include selecting a number of data points (axial intervals) on each axial side of a selected core point that are to be removed from the available core point position selection range.

Weighting may also be applied using selected weighting criteria (i.e. mean, standard deviation) as the value w in Eq. (2).

$$ESEV = \frac{w}{\left[\frac{|\alpha 1 - \alpha 2|}{\left(\frac{(\alpha 1 + \alpha 2)}{2}\right)}\right] * 100} \quad \text{(Eq. 2)}$$

where α1 is a calculated statistical measure from the original input data set of Z values and α2 is a calculated statistical measure from the subsampled data set of size N (not M, original 'cut' data points are included in this statistic).

The ESEV value may be chosen to produce comparable (large) values when minimization occurs. An associated problem with the foregoing transform is that when:

$$\left[\frac{|\alpha 1 - \alpha 2|}{\left(\frac{(\alpha 1 + \alpha 2)}{2}\right)}\right] * 100 \ll 1$$

the denominator as a fractional change in the value of a by the geometric average can become disproportionately large in comparison to other solutions. To mitigate the foregoing problem a domain mapping function may be applied to transform values from the range [0, ∞] to [0, 1] as follows:

$$ESEV^* = 1 - 2\left(\frac{-ESEV}{A}\right) \quad \text{(Eq. 3)}$$

where A is a scalar value used to compress or stretch the domain transformation; the user may change A in order to compare the various solutions in any set of x Monte Carlo iterations.

Upon completing x Monte Carlo iterations, the number of selection criteria (i.e. mean, standard deviation, etc.) may be geometrically averaged into a value referred to as ESEV. The foregoing value ESEV may then be subsequently multiplied by the currently executing input data curve's weighting value (Ω), resulting in a final value used to grade a current solution, referred to as ESEV***, as shown in Eq. 4.

$$ESEV^{*} = ESEV^{} \times \Omega \quad \text{(Eq. 4)}$$

After all x Monte Carlo iterations have completed, the iterations with the highest value of ESEV*** may be selected, and the data values at the corresponding array indices in the input curves (and depth) may be displayed superimposed on the original filtered data array of size Z as shown in FIG. 1.

5. Additional Functionality

Figure 2:
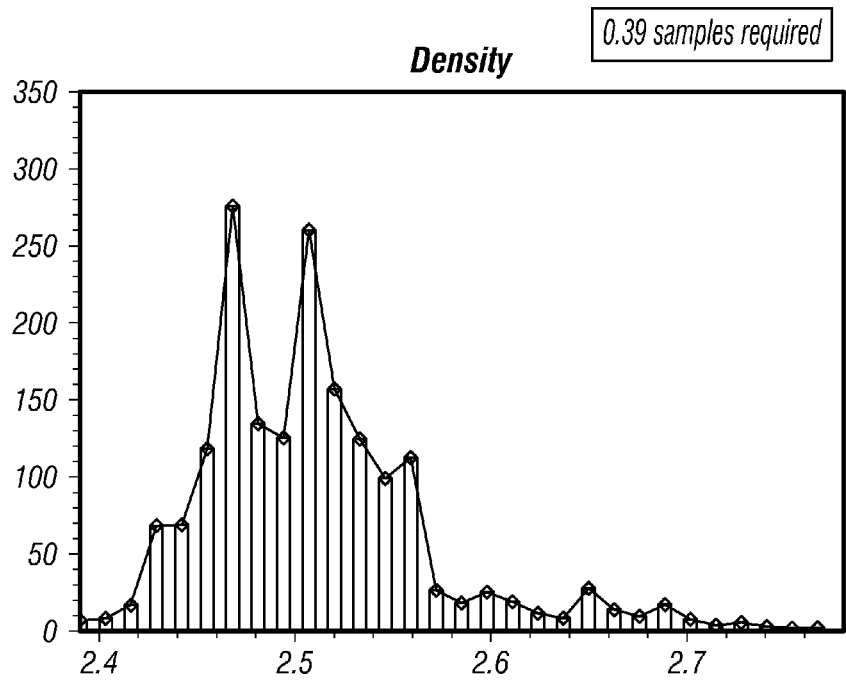
FIG. 2 shows an example data histogram plot.
Figure 2:
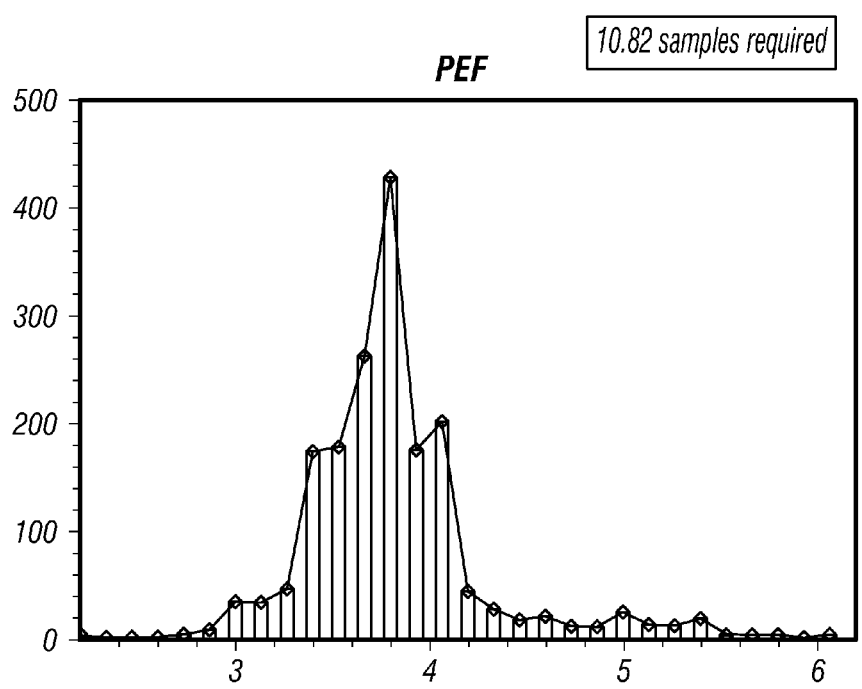

A method according to the present disclosure may also enable the user to visually observe where the core points are selected (spatially oriented) and the computer system may generate an output report, e.g., a data table, a histogram or other statistical graphic display with calculated statistics of solution sets for each axial interval, zone or facies, depending on how the user has selected axial intervals for processing, along with automatic screenshots (images of graphic user interface displays). In addition a method may include plotting/data visualization implemented as a user implemented screening mechanism and an interactive sample size selection calculator that determines N from user input confidence interval and margin of error values. FIG. 2 shows an example histogram plot.

All petrophysical data that are entered into a computer program according to the disclosure may be formatted to a static pre-determined specification. The following conditions for all input data may be met:

a. All input curve depth arrays should preferably be identical in size.

b. All curves, including facies curve, may be on the same sampling frequency or static set axial interval size or interpolated to obtain equal sample intervals where the raw measurements do not have equal sample intervals.

c. All data curves should have the same top and bottom depths.

d. All data curves should, as stated above, have interpolated values to fill gaps where measured data are not present, if the user wants to use the existing such depths.

e. Where whole core data are not available, data points in any one or more corresponding data curves may be substituted by null values (e.g., −999).

f. All data should be in good condition and order. Including data, for example, from within casing (i.e., incorrect values of electrical resistivity which may be required to be measured in uncased wellbore) or pickup data may distort data histograms. Data may preferably be edited first to exclude clearly erroneous data. Facies data curves may have numerical integer data only, e.g., facies={1, 2, 3, 4, 5}.

Input data curves may be selected by the user with a graphic display interface such as shown in FIG. 1. The user may select the data curves of interest from the auto-populated list and add the selected data curves to the list already displayed. The program may have as default curves certain types of input petrophysical data curves, e.g., natural gamma ray radiation.

The interface display shown in FIG. 1 may be used for data observation and visual quality verification only, not for computations.

Plotting Data

Figure 3:
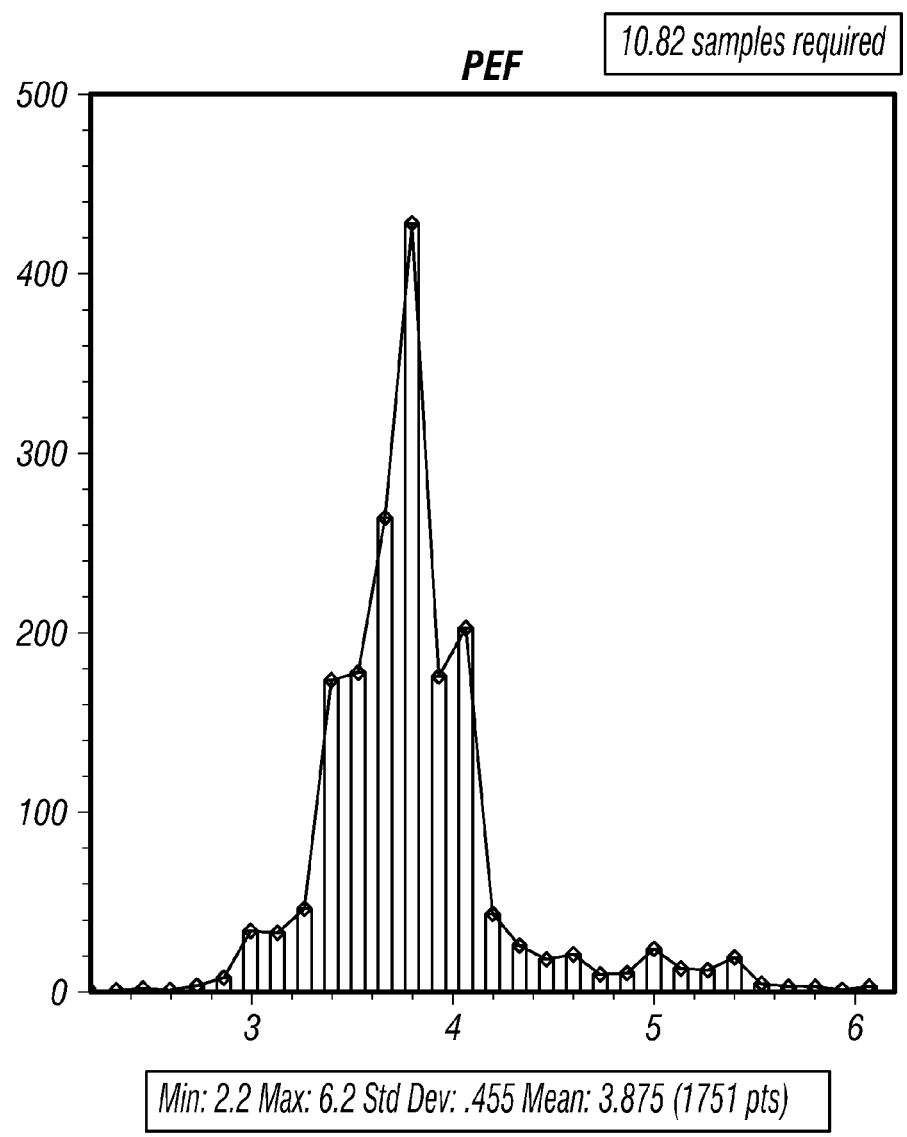
FIG. 3 shows an example data statistical plot.

Once the user has selected data curves of interest the user may decide how to visually display the data curves (example plot shown in FIG. 3). Three example options available to the user may include:

1. Plot the data by zone
Select a zone set
Select a zone of interest
Plot the data by facies
Select an appropriate facies curve from a drop down box
Select the facies of interest from a populated list box
Select "Plot Facies"

2. Plot a histogram of the sizes of contiguous facies data

Figure 4:
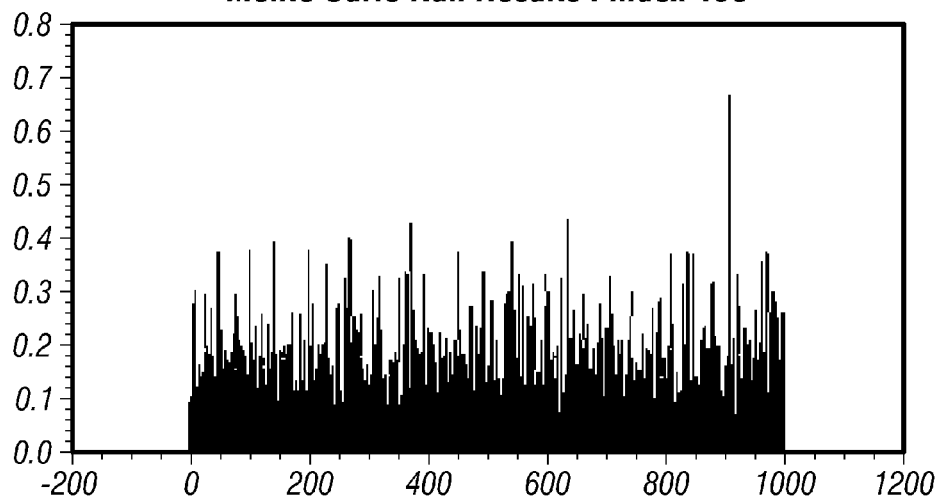
FIG. 4 shows an example Monte Carlo iteration data plot.
Figure 4:
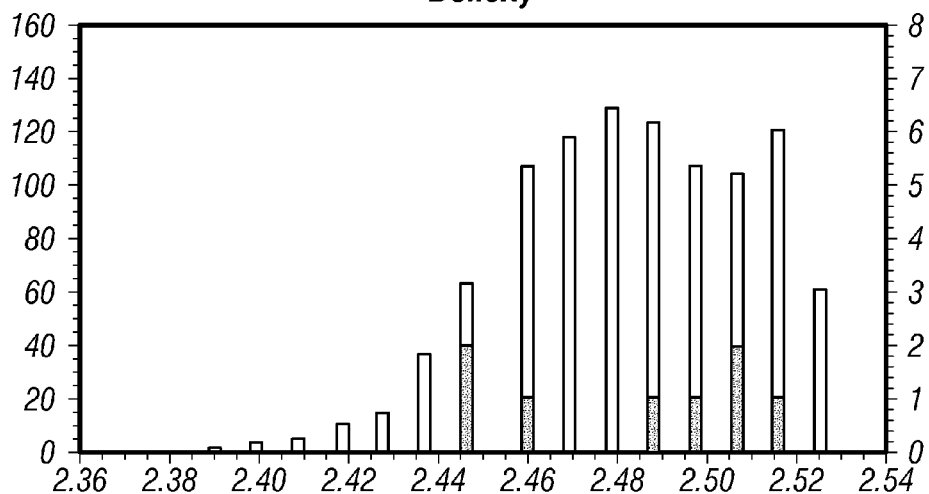
Figure 4:
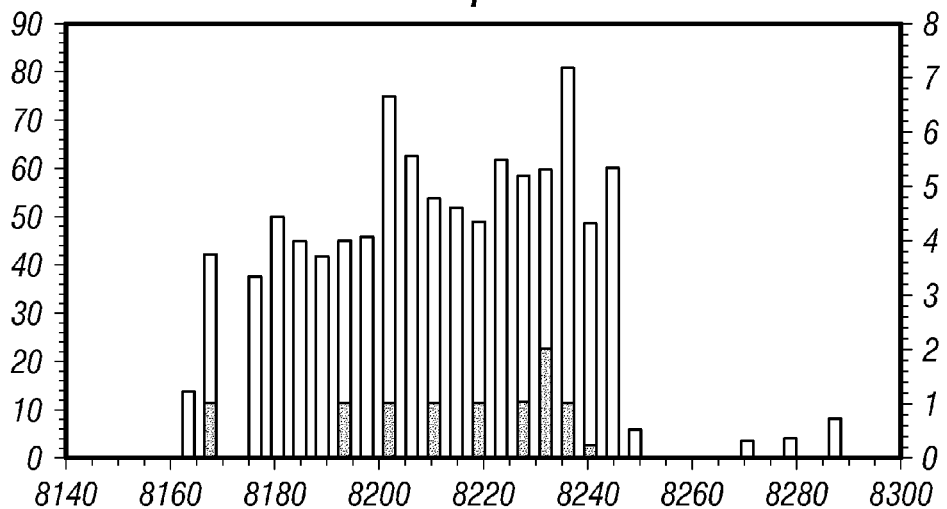
Figure 4:
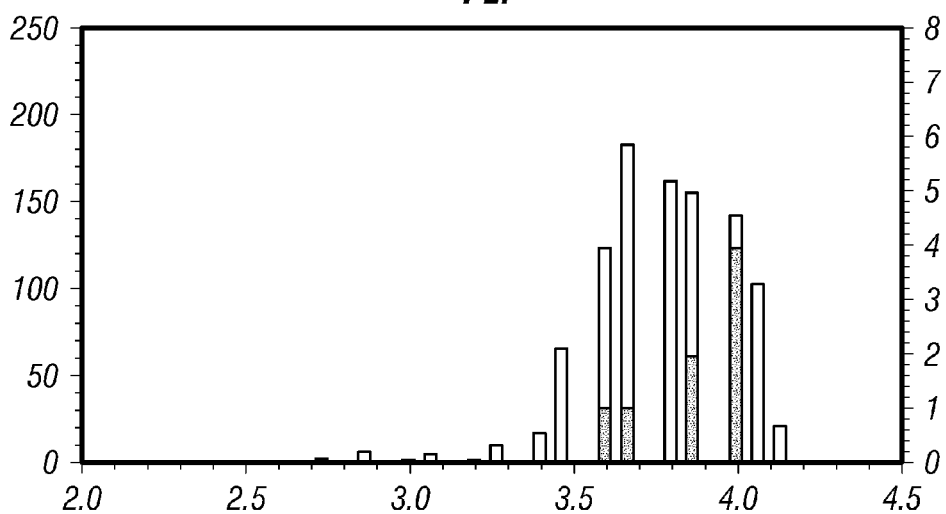

An example histogram is shown in FIG. 4. Note that the data shown are plotted over the entire depth or axial interval range Z of the curve set. In the event of preparing a program for rotary sidewall core points in a wellbore without having a whole core as a starting point, the user may create a core point zone to filter data out in that interval and select it prior to running the Monte Carlo module.

The user may also control data bin sizes by altering a selectable value in a graphic user interface field. All subsequent data plots may be presented with the updated number of bins. Additional data curves may also be added or removed from the graphic plot as long as they are constrained by the aforementioned conditions of array size equality.

The user may display selected curve data from minimum to maximum measured values or automatically select a display scale range (auto scale checkbox).

Statistics and Data Analysis

On the example display shown in FIG. 1 the user may observe two superimposed areas with input data displayed in the upper right and around the x-axis. The data shown near the x-axis are statistics computed from the data displayed in the histogram.

The M samples required in the upper right displays a solution to a calculation based on operating characteristic curves and statistical sampling described in the program function section below. There are boxes in the lower left labeled alpha, beta, and detection multiplier that may be changed by the user to affect this computed value.

Running Monte Carlo Iterations and Choosing Core Points

After the user has visually evaluated the input data, the user may initiate the Monte Carlo iteration. Given a required number of samples, M, a number of iterations x, required data filtering parameters, and conditions of solution matching the computer system may randomly choose core points throughout the selected depth range Z and display the results (selected core points) superimposed on displayed data distributions for the selected data curves.

The Monte Carlo output display may draw information directly from the data used to drive the data input display (FIG. 1). Data curves processed by the Monte Carlo iteration may be selected by the user as explained above. Should the user desire to add additional filtering by zone, facies or other filtering parameter, such filtering may be performed before initiating the Monte Carlo iteration. If the user does not wish to filter by zone, no zone should be selected prior to initiating the Monte Carlo iteration. The number of bins for histogram displays may be carried over into the Monte Carlo result display as well.

Upon starting the Monte Carlo iteration, a first user identified facies will be selected by default. On the upper central part of a display window the currently selected facies may be displayed along with the number of data points in the set that computations will be applied to. In addition, if filtering is done by zone the zone name and top and bottom depths will be displayed.

Options and Parameter Selection

In the Monte Carlo iteration user interface the following user selectable options and their respective functions may be displayed:

M number of samples

The size of the subsample set (M>0 and M<=size of (depth array))

Number of Iterations

The number of random subsample sets the program will generate

Filter axial length (feet or meters)

The program may display to the user interface a histogram of the size of the contiguous sections of the current facies. The user may elect to filter out anything larger than the entered value for use. This is specifically intended to eliminate very thin laminations from the core which are not suitable for sampling.

Weighting Curves

A weighting algorithm may be implemented to weight some input data curves (as selected by the user) more heavily than other data input curves when calculating a finite difference fit. This is not a linear increase as a domain mapping function is used to map the [0, ∞] domain to [0, 1] due to the nature of the results. The issue is that some of the input data values extend into ranges that are "large" so a mapping function may be used to constrain the range of data values to between 0 and 1. In applying the mapping function, the data may be compressed such that the changes are no longer linear between the two. Depending on which exponent is used in the domain mapping function the user can either compress the data to look for high quality solutions that are visually apparent on a computer data display, or stretch the input data such that lower quality solutions approach the value of 1.

The weighting feature may enable the user to experiment with the weights in order to attempt to fit certain matching criteria. The user may enter a weight factor into the computer input display (as part of a graphic user interface) to apply the weight to the selected curve, e.g., and without limitation from the list of examples below:

Use mean?

When this is selected, the program will grade solutions based on how well they match the input data curve means.

Use standard deviation?

Same as above, but for standard deviation.

Use depth?

When this option is selected, the program will grade solutions based on how well they match the variance in the axial position or depth.

Use P1, P10, P90, P99?

This option grades solutions based on how well they match calculated statistical percentile values.

Previous Core Samples

This option is intended to find replacement core points when failures occur during a procedure for extracting any of the initially selected core points. A user display may be presented to make available to the user a facility to enter depths from a previous program run (for both successfully obtained core samples and failed attempts). After entering the previous program calculated core point axial positions or depths, the sample size M may be kept as the original intended number of samples that needed to be collected. In the present example embodiment, M would be 8 where three samples failed to be obtained. Re-running the Monte Carlo iteration after entering the foregoing data may cause the computer to automatically exclude the failed core sample depths from the current run results, and any selected excluded core points entered proximate the foregoing from a solution set of possible core points. The program may display matches of the successful core points in order to help build out a next best possible core point data set.

Weighting Factor

For each one of the grading criteria selected above a weight can be applied after the domain transformation from [0,1] weighing the curve in the final geometric average. The range of acceptable values is all real numbers with the possibility of adding negatives. Making a value negative will retract from the total computed answer possibly creating spurious results due to the nature of the arithmetic.

Auto Scale?

The above function when enabled allows a program called ZedGraph to auto scale the controls instead of displaying all values from Max→Min. It usually compresses the data in the x domain for visual effect. Expressed differently, instead of displaying the input data from the minimum value to the maximum value for any input measurement, the data may be scaled between predetermined values to enable visual observation of the input data in "general" terms with respect to fixed endpoints.

1-2(-x/a) domain mapping function exponent

The foregoing function may be used to map solution grades into the [0,1] domain for normalcy and weighting. The exponent a may be changed by the user to compress or stretch the data in the y domain in order to better extenuate solution grades.

Enable Exclusion?

Exclusion is the removal of data points proximate selected random depths during the Monte Carlo iteration in order to ensure that subsequent selections are not too closely spaced in axial position to each other. The value provided may be scaled in number of depth sample interval points before and after each selected depth, in other words, at 0.1 meter data sample interval, 4 points would mean at a depth of 2500 meters no plug depths would be selected between 2499.6 and 2500.4 meters. The excluded depths also extend into other facies or zones as the program progresses. The exclusion procedure may significantly increase program run time.

Additional Filtering

The user may import depths from data curves (i.e., a fracture curve) or enter the depths manually into the computer system. The data sets may be further reduced by this array of imported or manually entered depths. No 'exclusion' is applied to these points, only these depths explicitly are filtered out of the data set.

Run

This causes the Monte Carlo iteration to begin and causes the results to be displayed.

Go To Index (n)

There are multiple non-unique solutions that come out of the simulation. Enter any index here from the Monte Carlo Run Results plot to view the results and if desired you may save them.

Clear Core Points Curve

When the user selects a save points feature on the user interface after a program run, a curve may be created, stored in the computer system and/or displayed named CorePts and is set equal to 1 where core plug selections are made.

Save Points

This feature causes the computer system to save the current Monte Carlo run into memory as the final result and also forwards the selected depths into subsequent runs if the exclusion option is selected. It will also automatically overwrite the CorePts curve mentioned above.

Output to Spreadsheet

This function will create a spreadsheet (e.g., and without limitation, Microsoft EXCEL format) for the user with each facies that has been modeled along with the saved sample depths.

Save Report

A report may be generated and saved for the user in a spreadsheet format including statistics information from each facies run along with a screen capture of the form at the time it was run showing options used along with the results.

Algorithms

In some embodiments, methods according to the present disclosure calculate statistics that may be based on multiple sets of data and compares them to statistics of randomly selected core points within the sets of data or within subsets thereof. Some options exist to filter the data such as contiguous depth (axial length) intervals, exclusion, and zoning.

Once the data have been filtered the following processes may be applied to each of a number, F of different geologic or petrophysical facies that may be input by the user:

a) statistical measures, such as those described above are computed on each of L selected data curves (in some embodiments after filtering) of N data points.

b) Monte Carlo iterations of M random samples are made where each set of samples has statistical measures computed.

c) a reciprocal of a normalized (e.g., percentage) difference of each statistical measure is determined between each of the L selected data curves and its random subset of size M on each of K iterations, and the foregoing may be converted into a graded index. The graded index may then be domain transformed to the domain [0, 1] and the results stored and/or displayed by the computer system. Weighting may be applied to the domain transformed graded index prior to computing the final result.

d) all computed and graded indices may be geometrically averaged into a final result index that is stored and subsequently may be displayed by the computer system in a Monte Carlo Run plot window. The numerically largest of the result indices may be selected as a best index and the input measurement data associated therewith may be displayed in the data value/depth space superimposed on the input data.

Evaluation of Monte Carlo run time may depend on which options are chosen by the user. Filtering may be performed once per facies F with a computational cost of $O(N^2)$. Monte Carlo iterations in general are approximately $O(N^2)$ due to the fact that typically N>>K*M. Problems may arise with Monte Carlo run time when exclusion filtering is enabled since generating acceptable random sets can be very expensive computationally.

Program Functions

1. Determining the Number of Samples to Select (M)

Various diagnostic plots may be displayed to the user on a graphic user interface to enable the system user to visualize the statistical nature of the input measurement data at in a number of different user selectable formats. The theory of operating characteristic curves has been implemented in this program assuming a binomial/normal data distribution that is symmetric and well behaved (i.e., not highly kurtotic and not having with significant skew). The data distribution is assumed to be one for which the conditions of the central limit theorem apply.

As described, for example, in, Mayor and Nelson, *Coalbed Reservoir Gas-In-Place Analysis*, 1997, Chapter 4, pp. 4.8-4.9 (Gas Research Institute Reference: GRI-97/0263), Bowker and Lieberman, *Engineering Statistics*, (1959) and G. Geoffrey Vining, *Statistical Methods for Engineers* (1998) a solution is provided for solving the equations for sample size given a distribution of data using the concept of power. Type I error, or the significance level, may be input by the user as alpha, and type II error may be input by the user as beta. In addition to these two values error type values, a value may be required to be input for detection multiplier which indicates the percent change detected in the mean.

What is being tested is the power (measure of sensitivity), or rejecting the null hypothesis when the alternative hypothesis is true. Expressed in more simple terms, if alpha=0.05, beta=0.20, and the detection multiplier is 10% then M samples are required in order to be 95% confident that there is an 80% chance to be able to detect a 10% variation in the mean of the distribution if samples are selected randomly. This gives a general guideline to the user (even though true random sampling is not being performed). The analytical solution to equations derived from equations in the Vining publication cited above on p. 163, assuming symmetry and solving for a one sided normal distribution, for a power of a hypothesis test:

$$\beta = \Phi\left(z_{\alpha/2} - \frac{\delta\sqrt{n}}{\sigma}\right) - \Phi\left(-z_{\alpha/2} - \frac{\delta\sqrt{n}}{\sigma}\right) \quad \text{(Eq. 5)}$$

Assuming that $\delta$ is $>0$ for a one sided hypothesis;

$$\beta \cong \Phi\left(z_{\alpha/2} - \frac{\delta\sqrt{n}}{\sigma}\right) \text{ where } \delta = \mu - \mu_0 \quad \text{(Eq. 6)}$$

wherein $\Phi$ is the normal CDF. Finally, $$n \cong \frac{(z_{\alpha/2} + z_\beta)^2 \sigma^2}{\delta^2} \quad \text{(Eq. 7)}$$

The above analysis shows that for any given data distribution and the above given default values of alpha and beta, in order to detect a 1 standard deviation change in the mean value, 8 samples are required.

The user may change the values of alpha and beta as necessary and should note that the percent change in the mean value changes as the input data change. For example: a 10% change in bulk density values (around a mean of 2.65 grams per cubic centimeter) would be a range of 2.385-2.915 g/cc. A small number of samples would be required to detect a change of this magnitude. However, for photoelectric effect (PEF) around a mean of 3 barns per electron a 10% change would correspond to a range from 2.7 to 3.3 barns/e, which might be considered acceptable and require 10 samples. For the example of bulk density it may be the case that a 2% change in mean would be more appropriate and yield a different number, M, in the calculation. The results may be dependent on the skill of the user in understanding possible ranges and variations with respect to the type of input data selected.

By way of further clarification of user determination of the number of samples, although seemingly random Monte Carlo iterations are being performed there is non-randomness about the selection criteria biased by the user and the distribution of the input data (physical core, well log measurements, etc.). The user may very well be able to adequately represent the data with a subsample of size 3. The user may also at the same time need to obtain ten samples in order to have enough samples to perform the analysis required.

A user might also take account of the concept of effect size from estimation statistics (such as Z-factors) in order to quantify the minimization of error in each solution. Total error summed over an entire program run might be compared for different sample sizes in order to choose an acceptable sample size solution.

2. Performing Monte Carlo Iterations

An example method, after selecting M, is to begin performing Monte Carlo iterations and displaying the results to the user for visual evaluation. The user may then have the option of either using other solutions within a single iteration or re-running The Monte Carol iterations until solutions are displayed that suit user selected preferences or criteria.

Example 1

Multiple runs are made with a negatively skewed distribution and core points are not being captured in the skewed distribution tail.

The user may use P1 or P10 criteria to find solutions that contain more core points in the zone of interest. To do this, other selection criteria may be disabled and the Monte Carlo iteration may be rerun using P1 or P10 as selection criteria.

Example 2

The user prefers to capture data in tail regions of distribution as large amounts of "poor rock" compromise the near-mean region of the data.

Again, the user can disable mean or variance matching and grade solutions based on P1/P99 or P10/P90 matches. This will spread the data out toward the tails and put less emphasis on the mean.

3. Example Workflow

The basic workflow may provide that the use evaluates each individual facies independently and changes configuration options until the best core points are found for each facies. It is recommended that the user name the facies in order of importance, e.g., if the primary goal of the coring program is to sample the best reservoir zones which correspond to facies "X", label this facies as integer value 1 in the facies data curve and label further facies in numerical order of importance.

Once all core points are identified, the user may review them in a visual display with statistical measure curves and data curves to ensure that the goal of the core point selection program has been accomplished. If this is the case, the user may input a command to the computer system to save the current set of data points. Although the user may not be able to save the state of the computer program at any particular moment in time and return to that same state at a later time, by saving a particular set of intermediate data points it is possible to preserve a static "snapshot" in time of intermediate solutions of the core point selection program. Since these solutions may be non-unique, it may be possible to operate the computer program iteratively until a similar solution set is calculated.

After the above process of identifying core points is completed, a core sample may be obtained at any one or more of the identified core points using any coring method known in the art, including annular core drilling, sidewall core drilling and percussion sidewall core sampling.

Figure 5:
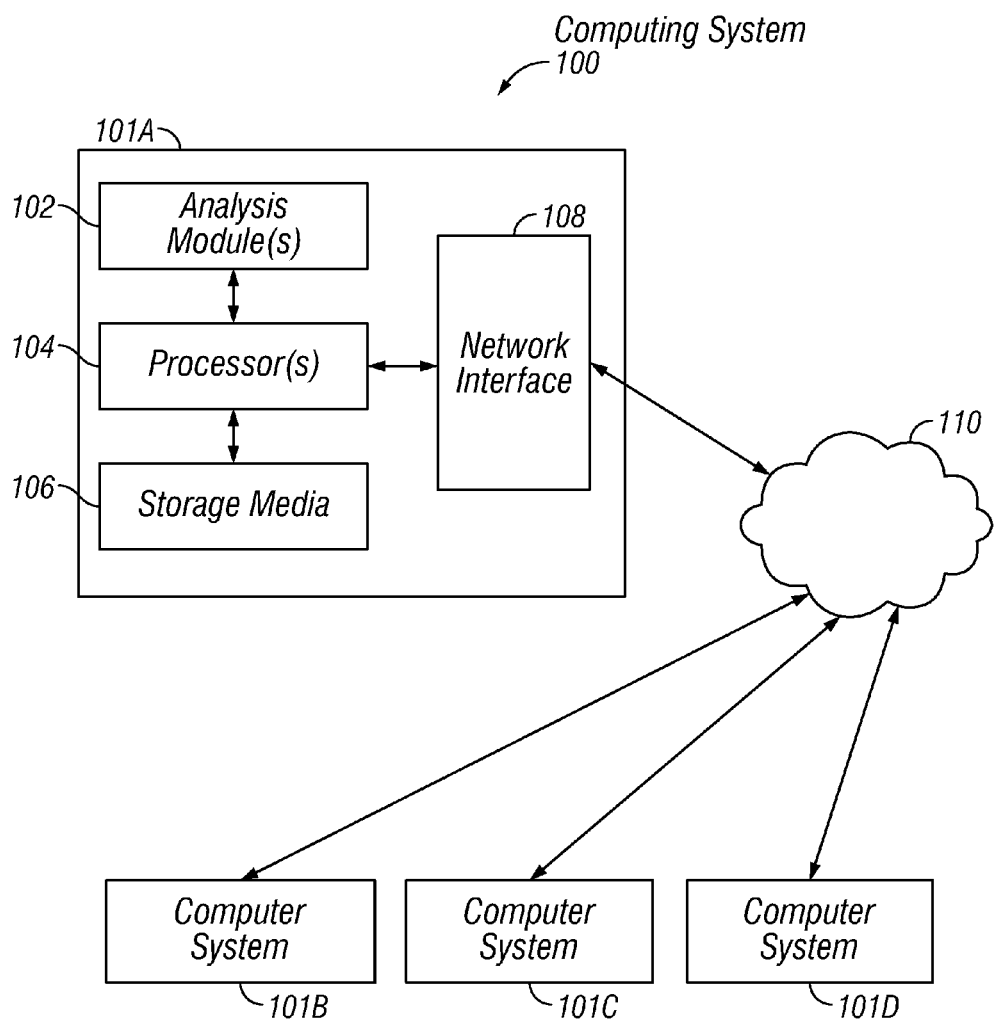
FIG. 5 shows an example computer system that may be used in some embodiments.

FIG. 5 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks explained with reference to FIGS. 1 through 4. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 5 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 5, and/or computing system 100 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for selecting positions within a formation from which to extract samples of the formation, comprising:
   in a computer, selecting a zone from at least one formation;
   in a computer, calculating at least one statistical measure of at least one petrophysical measurement made within the zone with respect to position along the selected zone;
   in the computer, selecting a predetermined number of formation sample positions at randomly selected locations along the selected zone;
   in the computer, calculating the at least one statistical measure for the randomly selected positions;
   in the computer, using a Monte Carlo iteration performed a predetermined number of times, randomly reselecting the locations along the selected zone and recalculating the at least one statistical measure for the randomly reselected locations until the at least one statistical measure for the randomly reselected locations is a maximum for a user selected statistical criterion applied to the at least one statistical measure of at least one petrophysical measurement with respect to position along the selected zone; and
   using the randomly reselected locations from when the at least one statistical measure for the randomly reselected positions is a maximum as the formation sample positions.

2. The method of claim 1 wherein the at least one statistical measure of the at least one petrophysical measurement comprises one of mean, variance, standard deviation, and a selected percentile.

3. The method of claim 2 wherein the selected percentile comprises one of a first percentile, a tenth percentile, a ninetieth percentile and a ninety-ninth percentile.

4. The method of claim 1 wherein the predetermined threshold comprises an effect size equivalent value.

5. The method of claim 1 wherein the zone is selected based on a geologic facies.

6. The method of claim 5 wherein the geologic facies is selected based on at least one measured physical property with respect to axial position within the subsurface formations.

7. The method of claim 1 wherein the at least one petrophysical measurement comprises at least one of electrical resistivity, natural gamma radiation, neutron hydrogen index, density, thermal and/or epithermal neutron capture cross-section, nuclear magnetic relaxation time distribution and acoustic shear and/or compressional velocity.

8. The method of claim 1 further comprising in the computer, filtering the at least one petrophysical measurement prior to calculating the at least one statistical measure thereof.

9. The method of claim 8 wherein the filtering comprises at least one of electrofacies filtering, formation type filtering and axial length filtering.

10. The method of claim 9 wherein the electrofacies filtering and the formation type filtering comprise calculated facies or calculated formation type using measurements of at least one of electrical resistivity, natural gamma radiation, neutron hydrogen index, density, thermal and/or epithermal neutron capture cross-section, nuclear magnetic relaxation time distribution and acoustic shear and/or compressional velocity and combinations thereof.

11. The method of claim 1 wherein calculating the predetermined number of formation sample positions comprises, in the computer, calculating a number of samples N required to meet predetermined confidence interval and margin of error values.

12. The method of claim 1 wherein the formation comprises at least one of a subsurface formation penetrated by a wellbore and a core sample drilled and withdrawn from a wellbore.

13. The method of claim 1 further comprising obtaining a sample of a formation at at least one of the formation sample positions.

* * * * *

UNITED STATES PATENT AND TRADEMARK OFFICE
CERTIFICATE OF CORRECTION

Page 1 of 1

PATENT NO. : 9,921,329 B2
APPLICATION NO. : 14/936731
DATED : March 20, 2018
INVENTOR(S) : Banas et al.

It is certified that error appears in the above-identified patent and that said Letters Patent is hereby corrected as shown below:

On the Title Page

Item (72) Inventor is corrected to read:
--Ryan Banas, Houston, TX (US);
Eric Vosburgh, San Antonio, TX (US)--

Signed and Sealed this
Sixth Day of November, 2018

Andrei Iancu
*Director of the United States Patent and Trademark Office*